May 23, 1967 R. BARKSTROM ETAL 3,320,730
CORN PICKER
Filed Feb. 24, 1965 11 Sheets-Sheet 7

Inventors:
Reynold Barkstrom
Ralph L. Sutton
T. Gary Drayer
By
G. David AuBuchon Atty.

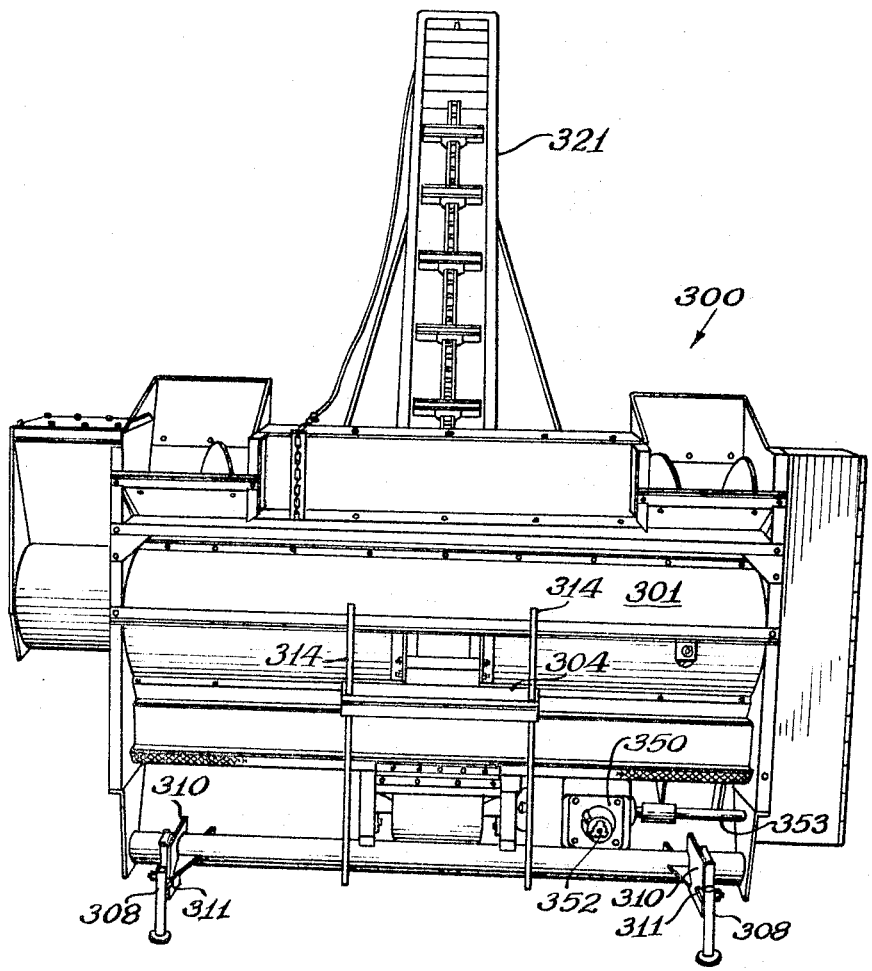

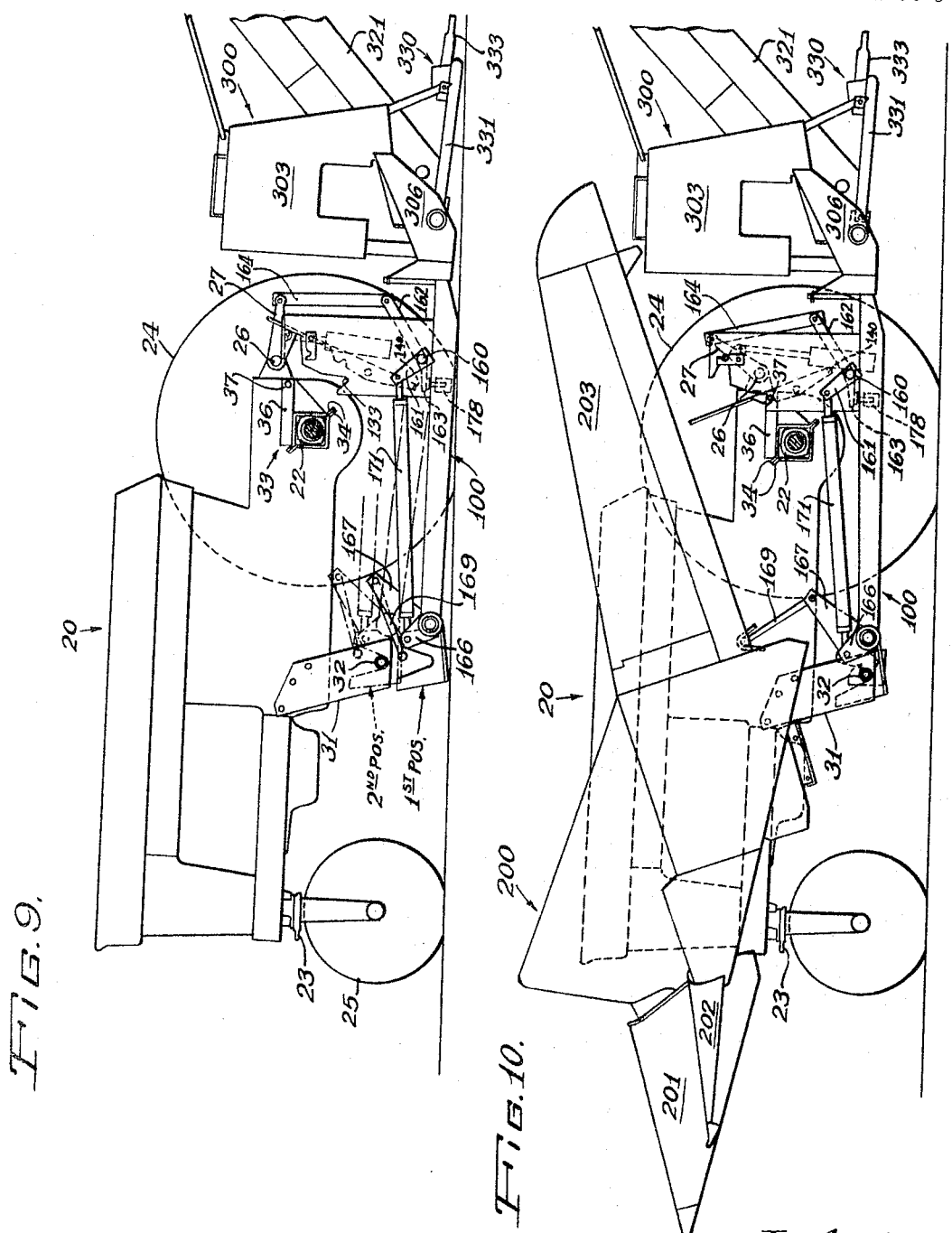

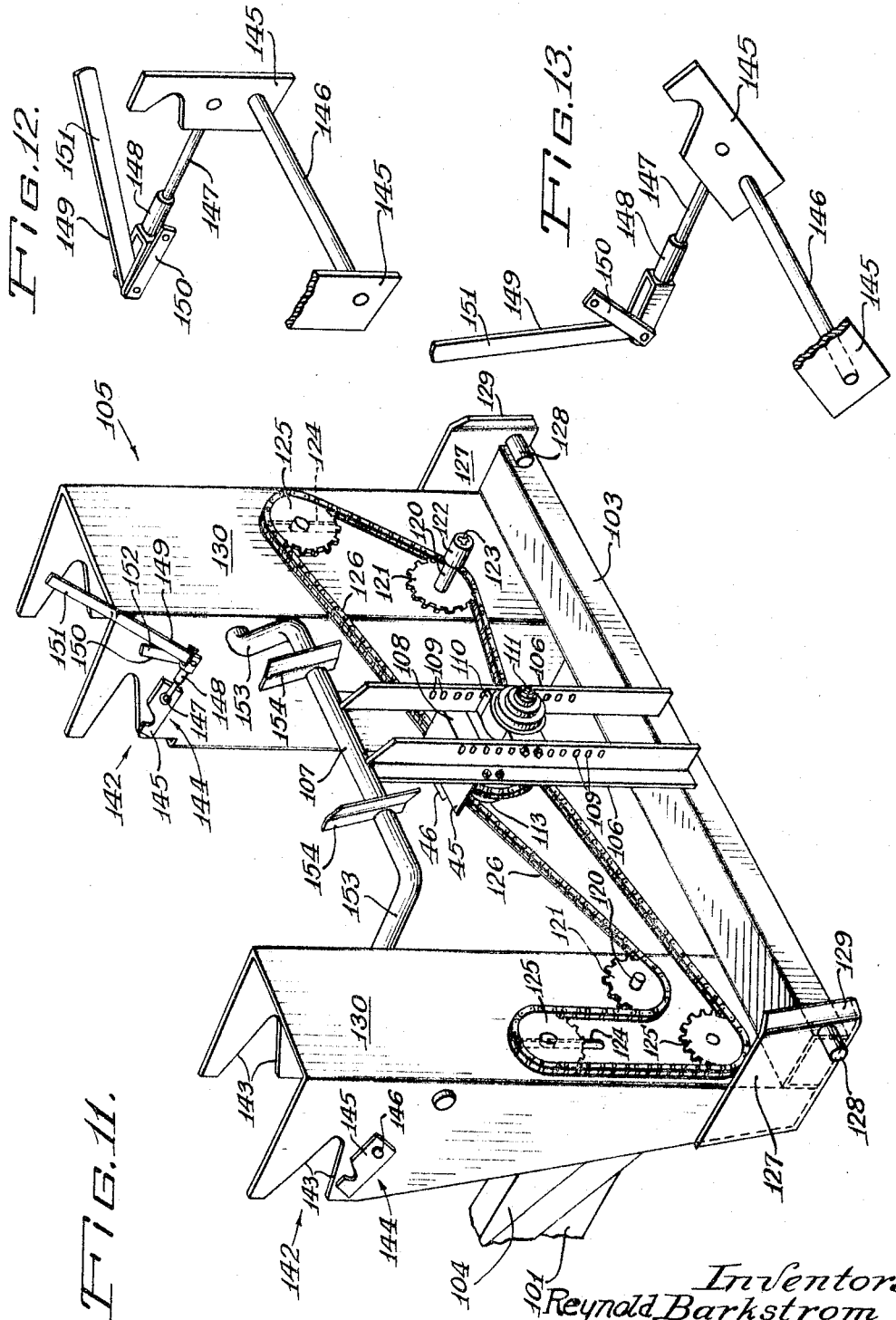

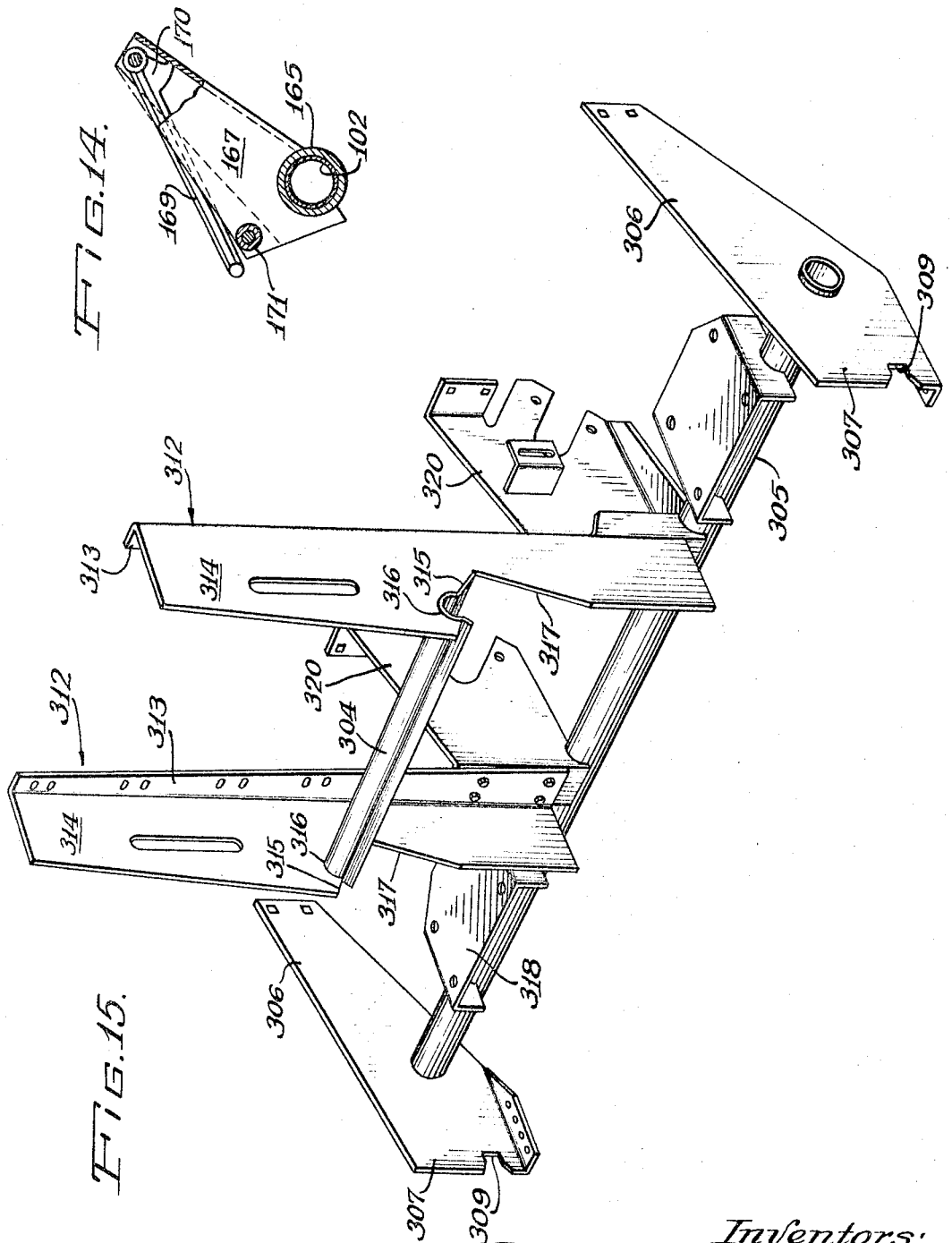

United States Patent Office 3,320,730
Patented May 23, 1967

3,320,730
CORN PICKER
Reynold Barkstrom, Moline, Ralph L. Sutton, Rock Island, and T. Gary Drayer, East Moline, Ill., assignors to International Harvester Company, Chicago, Ill., a corporation of New Jersey
Filed Feb. 24, 1965, Ser. No. 434,972
29 Claims. (Cl. 56—15)

This invention relates generally to improvements in corn harvesting machines and the like and more particularly to a new and improved two-row tractor-mounted corn harvesting machine.

Corn harvesting operations are becoming more diversified. In addition to picking and husking the corn in the field it is becoming increasingly popular to shell in the field and also to grind the shelled corn and the cobs in the field. This trend emphasizes the desirability of having a machine that can be easily adapted to all of these operations, with optional processing units available for use on the basic machine. Present corn pickers are limited in their flexibility to accept the optional processing units and the time required to prepare the picker for accepting these attachments and subsequent installation on the machine is extensive.

The general purpose of this invention is to provide a corn picking machine that can be quickly mounted and dismounted upon a tractor and is adapted to aptly receive any of a plurality of processing units. To attain this the present invention contemplates the use of simple, easily attachable tractor mounts, a main frame that can be fixed to the tractor mounts by the utilization of the tractor's hydraulic power system, and picker and processing units that can be quickly mounted and dismounted upon the main frame. The tractor mounts are of a compact design that will not interfere with other normal uses of the tractor and thus can be left on the tractor for other operations. The tractor mounts are adapted to be mounted on a high percentage of the available tractors of comparable horsepower, however, their size and shape varies to compensate for the difference in tractor design. By providing tractor mounts in a variety of sizes, the main frame and other units are limited to a single standard size. The tractor is driven into place over the picker's main frame and through the use of the tractor's hydraulically powered rockshaft the main frame is attached to the tractor mounts. This operation can be performed with the operator seated on the tractor without any additional assistance. The picking unit and an assortment of processing units can be mounted on the main frame by merely driving the tractor into position and hydraulically actuating the rockshaft. The connection of the main frame to the tractor and the mounting of the picking and processing units upon the main frame can be effected in uneven or muddy terrain in a comparably short period of time. The power take-off of the tractor is provided with a universal coupler that is automatically coupled to a second universal coupler carried by the main frame when the main frame is connected to the tractor. This, of course, eliminates the necessity of the operator dismounting from the tractor and manually completing a coupling between the tractor power take-off and the picker unit. The quick coupling means carried by the main frame, adapted to receive the processing units, are capable of providing a sturdy connection between the main frame and large processing units such as a sheller-grinder having a trailing elevator. Despite the size and bulk of the processing unit, this quick connector permits mounting and dismounting from the tractor seat and automatically couples the drive from the main frame to the processing unit. It is intended that any of a variety of processing units such as a husker, sheller or grinder or units that perform a combination or plurality of these functions can be easily mounted and dismounted. On each of these units the identical quick coupling structure and ground-engaging parking devices are provided to permit the interchangeability. The novel ground-supporting or parking devices, provided for the processing units, also function as latching means between the processing unit and the main frame and as a drawbar for the connection of a trailing wagon. Although mounted pickers and various processing units are available, this invention integrates them into a compatibile assembly that can be mounted, rearranged and dismounted easily and quickly. This integraded system has greatly reduced the set up time, dismount time and remount time of pickers now available. In addition, the various units of the picker can be easily stored without the need of special jigs or jacks.

An object of the present invention is the provision of a corn harvester that can be connected and coupled to a tractor by the operator from the tractor seat.

Another object is to provide a corn harvester that can quickly mount and dismount processing units in uneven or muddy terrain.

A further object is to provide a corn harvester that utilizes the hydraulically operated tractor rockshaft for mounting and dismounting all units of the harvester.

Still another object is to provide a corn harvester main frame including mechanism connected to the tractor rockshaft through which the power is transmittted to mount the main frame, the picking unit and the processing units on the tractor.

Still another object of the present invention is the provision of a corn harvester main frame that is automatically coupled to the tractor power take-off when it is mounted.

A still further object is the provision of a processing unit having a combination parking, latching and drawbar mechanism.

These and other objects of the invention will become more apparent from the specification and drawings, wherein:

FIGURE 4A is a side view of the main frame's universal drive joint;

FIGURE 8 is a front perspective view of the processing unit;

FIGURE 9 is a schematic drawing of the tractor, main frame and processing unit showing the front portion of the main frame in a first and second position;

FIGURE 10 is a schematic drawing of the tractor, main frame, processing unit and picking unit showing the picking unit in a transport position.

FIGURE 11 is an isometric drawing of the rear portion of the main frame;

FIGURE 12 is an isometric drawing of the latch means for connecting the picking unit to the main frame;

FIGURE 13 is an isometric drawing of a latch means for connecting the picker unit to the main frame;

FIGURE 14 is a cross-sectional view taken along lines 14—14 of FIGURE 4; and

FIGURE 15 is an isometric drawing of the processing units' frame.

Figure 1:
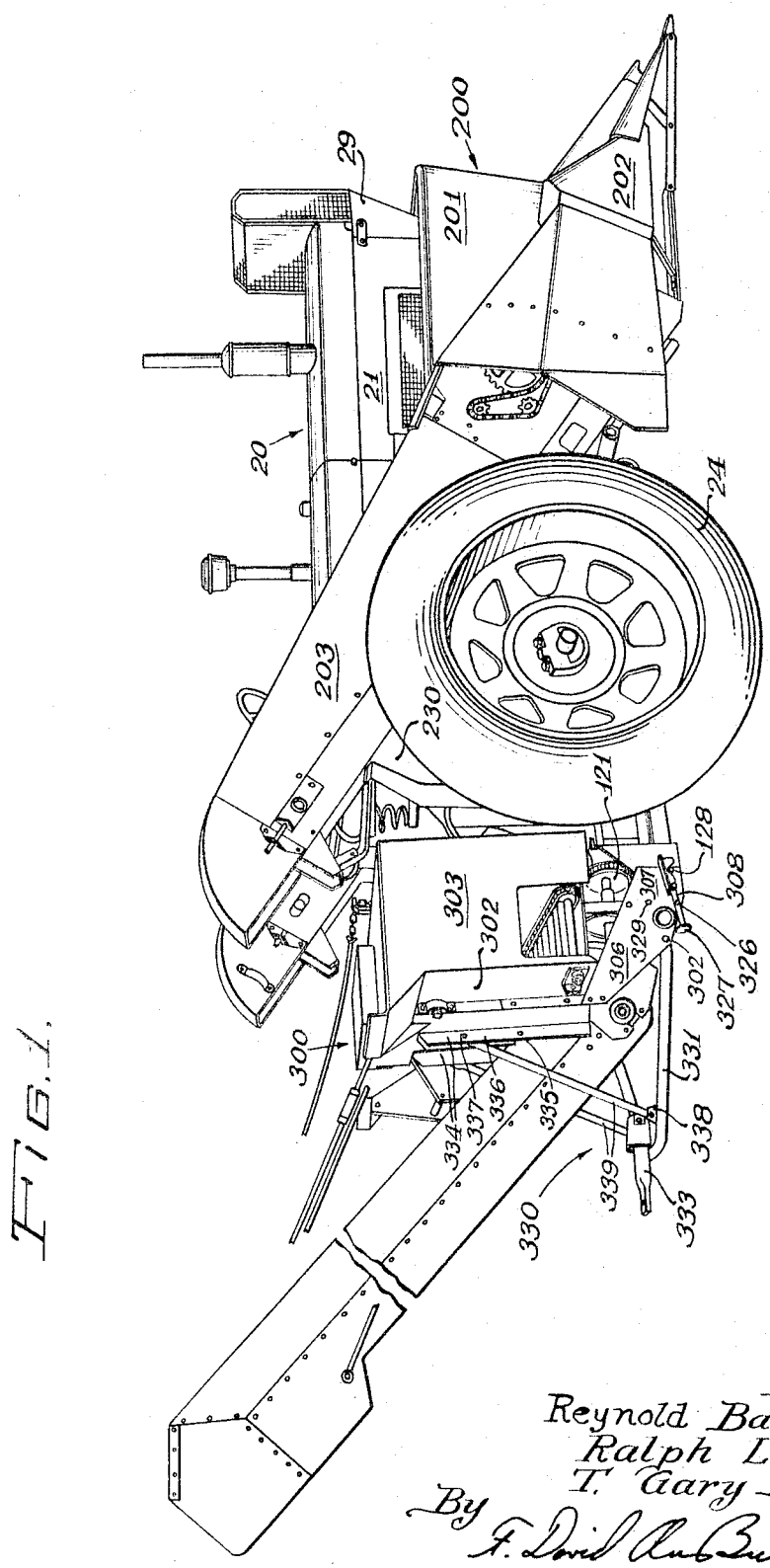
FIGURE 1 is a perspective view of the tractor mounted corn harvester.

Referring now to the drawings wherein like reference characters designate like or corresponding parts throughout the several views. There is shown in FIGURE 1 the tractor 20 having the corn picking unit 200 and a processing unit 300 mounted thereon. The tractor 20 is of the type having a longitudinal chassis 21, a rear axle unit 22, dirigible front wheel support 23, drive wheels 24, front wheels 25, a hydraulically actuated hitch rockshaft 26 having lever arms 27, and an air scoop 29.

Figure 2:
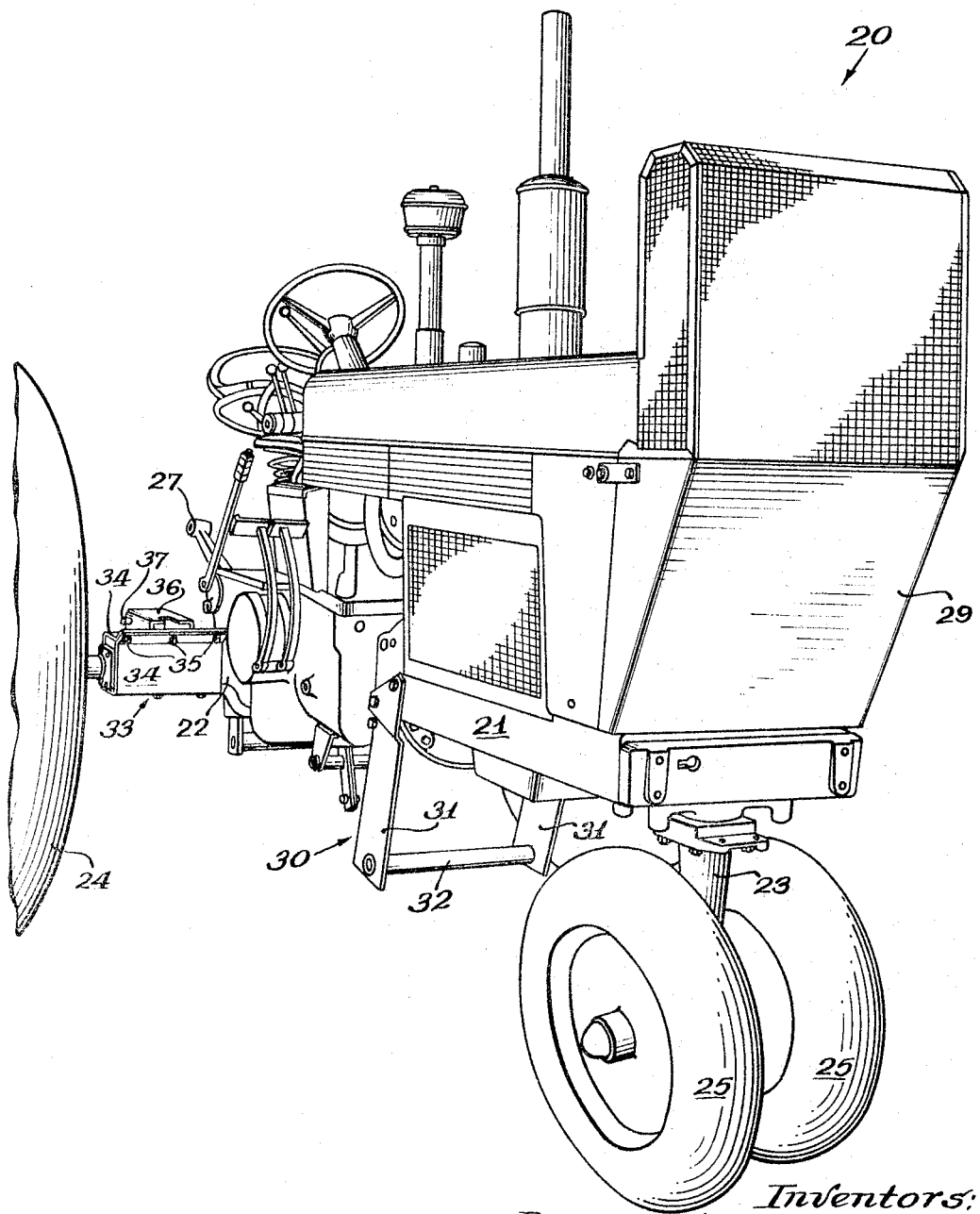
FIGURE 2 is a front perspective view of the tractor fitted with mountings to receive the corn harvester.

As can be best seen in FIGURE 2, a front tractor mount 30 is secured to the longitudinal chassis 21 between the front wheels 25 and the drive wheels 24. The front tractor mount 30 comprises a pair of plates 31 bolted to the tractor chassis and connected at their free ends by a horizontally extending bar 32. As can be best seen in FIGURES 2 and 3, a pair of rear tractor mounts 33 are secured to the rear wheel axle unit 22. Each of the rear tractor mounts 33 is made up of a pair of V-shaped plates 34 having flanges through which bolts 35 extend for connecting the V-shaped plates together. The V-shaped plates are bolted in place over the rear wheel axle unit and support channel 36 that in turn carries a shaft 37 having collars 38 that are adapted to restrain the axial movement of the shaft 37. The shaft 37 has end portions extending outwardly of the channel 36. A pair of guide plates 39 having flat surfaces and edges converging downwardly from the edge of the channel 36 constitute guide or deflection means and also function to stabilize the main frame upon the tractor in the fore and aft direction as well as the transverse direction.

Figure 3:
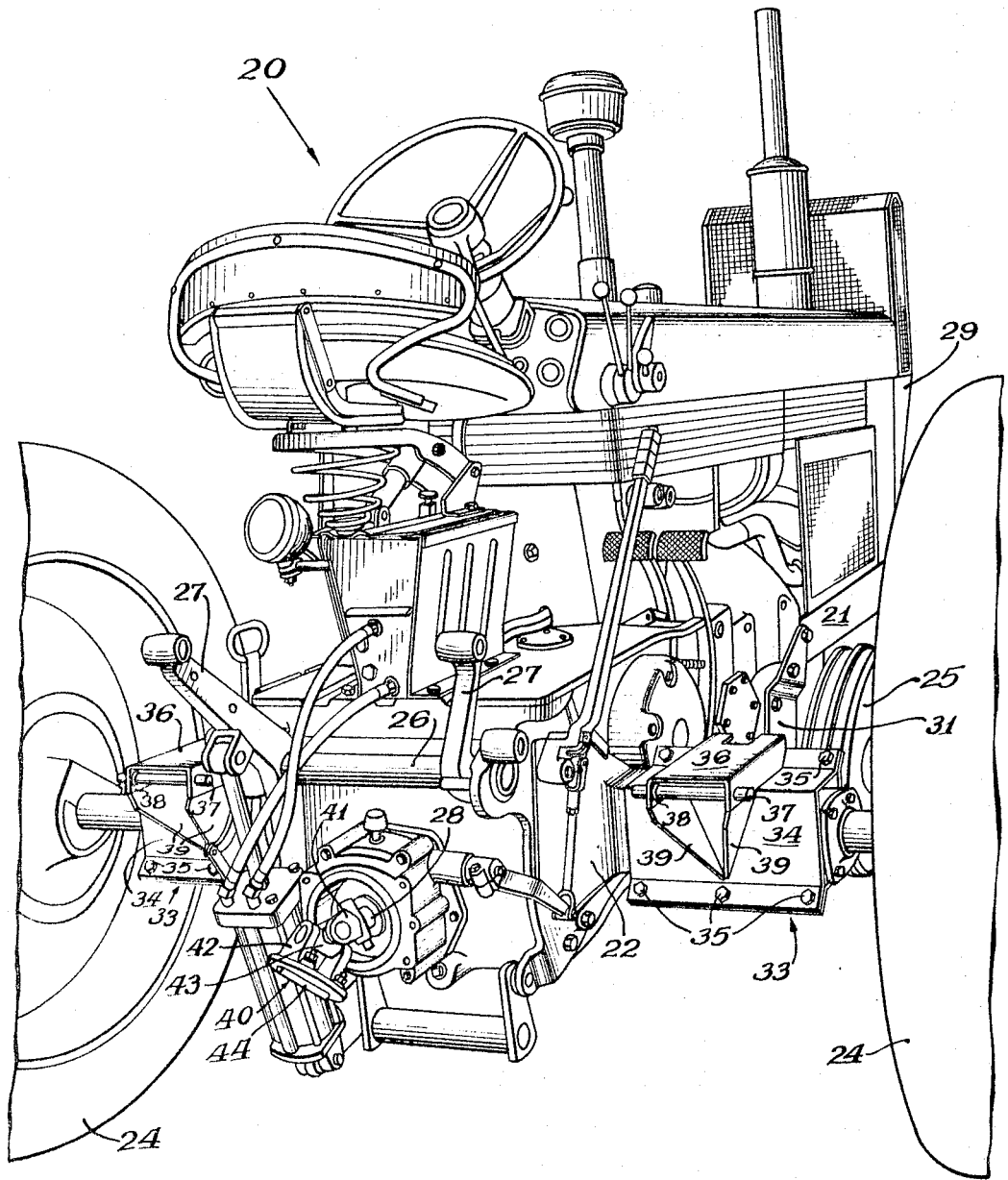
FIGURE 3 is a rear perspective view of a tractor fitted with mountings to receive the corn harvester.

A first universal drive joint 40 is mounted on the conventional power take-off shaft 28 (see FIGURE 3). The drive joint 40 comprises an inner yoke 41, and an outer yoke 42, connected to the inner yoke through a spider 43. The outer yoke 42 has secured thereto or is integral with a driving member 44.

Referring now to FIGURES 4, 4A, 7 and 11, the main frame 100 will be described. The main frame 100 is made up of a pair of longitudinally extending beams 101 connected by a transverse tube 102 and a transverse beam 103. Both the transverse tube and the transverse beam extend outwardly beyond the longitudinal extending beams 101. The transverse tube 102 defines the front portion of the main frame and the transverse beam 103 defines the rear portion of the main frame. Platforms 104 are formed from sheet metal or the like between the outwardly extending portions of transverse beam 103 and the longitudinally extending beams 101. A vertical section 105 extends upwardly from the rear portion of the main frame and is made up of a pair of vertical channels 106, a pair of upright posts 130 and a horizontal pipe 107 forming the upper edge of said vertical section. The horizontal pipe 107 forming the upper edge of the vertical section 105 has offset portions 153 at each end that are mounted in the posts 130. The offset portions 153 position the major portion of pipe 107 to the rear of posts 130 where it is completely unobstructed from above. Outwardly and upwardly diverging guide plates 154 are secured to horizontal bar 107 and function to align the processing unit 300 with the main frame 100.

The vertical channels 106 have a plurality of spaced apertures 109 formed therein. A mounting bracket 110 having a bearing means is adjustably mounted on the vertical channels 106. The adjustable mounting of bracket 110 is to accommodate for different tractors upon which this picker can be mounted. A stub shaft 111 having a double sprocket 108 is carried by the bearing means of said mounting bracket 110 (see FIGURE 4A). The front end of the stub shaft 111 mounts a second universal drive joint 113 comprising a rear yoke 114 that is splined to the stub shaft 111 and connected through a spider 117 to a front yoke 115. There is a shoulder or the like to limit the sliding movement of rear yoke 114 upon stub shaft 111. The front yoke 115 is secured to or integral with a driven member 116. A coil spring 118 is provided for biasing the rear yoke 114 in a forward direction.

As shown in FIGURES 4, 4A, 7 and 11, a support 45 is adjustably mounted on the vertical channels 106 above the second universal drive joint 113. A leaf spring 46 that is adapted to hold the top edge of the outer yoke 116 is adjustably connected to support 45 by a slot 47 and bolt arrangement 48. The support 45 and catch 46 function to hold the second universal drive joint 113 in position to be coupled to the first universal drive joint 40 when the rear portion of the main frame 100 is elevated. It should be noted that the catch 46 holds the outer yoke 116 in a position such that when the coupling is completed the yoke 116 will pivot out of contact with the catch 46. Since the main frame is substantially identical on the right and left hand sides the same reference numerals will be used to identify items that are duplicated on either side of the main frame.

A post 130 rises from each corner of the main frame 100, and a shaft 120 having a sheave 121 is journalled in the rearward wall of each post 130. The rear portion of this shaft carries a drive member 122 having a clover leaf depression 123 through which rotary motion is transmitted to the processing unit 300 (see FIGURE 11). Depending upon the power requirements of the processing unit, a coupling may be made to etiher or both drive members 122. Tension take-up sheave 125 are journalled in slots 124 formed in the rear wall of post 130. The position of sheave 125 can be adjusted in slots 124 to vary the tension in chains 126 that transmit rotary motion from the double sheave 108 to sheaves 121. Since it is desirable, for driving the various operating components of the picking and processing units, that shafts 120 rotate in opposite directions on idler sheave 125' is provided on one post 130. By arranging the chain 126 on one side around idler sheave 125' as indicated in FIGURE 11 rotation of shafts 120 in opposite directions is accomplished. Shafts 120 are mounted in bearings 173 adjacent the front wall of post 130 and are connected to a coupling 177 through extensible shafts 175 through which power is supplied to the picking units (see FIGURE 4).

Rearwardly extending plates 127 having inwardly bent tabs 129 are mounted on the ends of transverse beams 103 along the sidewalls of post 130. Support shafts 128 are mounted on plate 127 and function to connect the processing units 300 to the main frame 100. The tabs 129 function as guide means to properly seat the processing unit 300 on the main frame.

Figure 4:
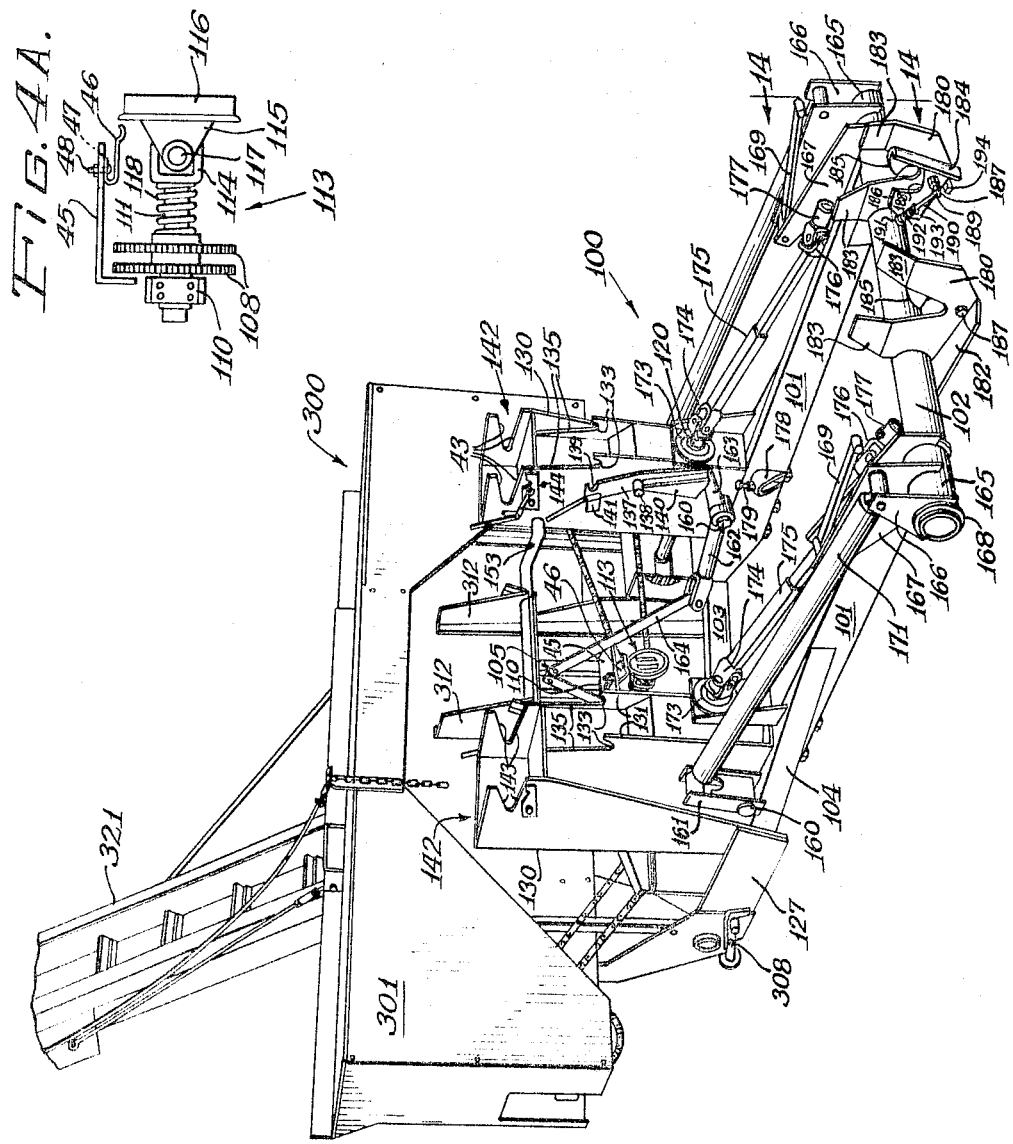
FIGURE 4 is a perspective view of the unmounted main frame and processing unit.

As can be best seen in FIGURE 4, each post 130 includes a pair of vertical walls 131 in which mounting seats 133 are formed by upwardly opening notches. The edges 135 of walls 131 extend upwardly and rearwardly and function to guide the shafts 37, carried by the tractor rear axle unit, into the proper engagement with seats 133. Rear locks 136 including a latch bar 137 are mounted by a pivot pin 138 on the inner walls of the post 130 and function to secure shafts 37 in seats 133. The latch bar 137 has a notch 139 formed in its upper arm located such that when the latch bar is pivoted forwardly the notch 139 forms a closed aperture with seats 133. A stop 141 is mounted on the inner wall of the post 130 to prevent counterclockwise rotation of latch bar 137 as seen in FIGURE 4. The lower arm of latch bar 137 terminates in a stop 140 which is positioned when latch bar 137 is against stop 141 such that it will engage front foot 163 of the pivot shaft 160 for a purpose that shall be described in greater detail.

The upper ends of post 130 form the picker mounts 142. Notches formed by diverging edges 143 are provided in the outer and inner walls of post 130 and serve to guide and seat the picking unit pivots 232. Latch means 144 are carried by the post 130 for locking the picking units in place on the picker mounts 142.

The latch means 144 are shown on a post 130 in FIGURE 4 and in detail in FIGURES 12 and 13. A pair of latch bars 145 are carried on the free ends of a pivot shaft 146 which is journalled on the post 130. One end of a rod 147 is pivotally connected to one of the latch bars 145 at a point displaced from the pivot shaft 146. A member 148 terminating in a yoke is connected by screw threads to the rod 47. The purpose of this screw thread connection is to provide for adjusting the latch means 144. A bell crank 149 having an arm 150 and a handle 151 is pivotally connected at its vertex to the yoke of member 148. The free end of the arm 150 is pivotally connected to the post 130 by a pin 152. FIGURE 12 shows the position of the latch means 144 in a closed position and FIGURE 13 shows it in the open position.

A pivot shaft 160 is rotatably mounted on each frame 101 and has a pivot shaft arm 161 rigid therewith on the outer portion. The pivot shafts 160 are arranged to be mounted at several locations along frames 101 to accommodate various tractors. The inner portion of the pivot shaft 160 carries a lifting arm 162 and a front foot 163. The free end of each lifiting arm 162 is pivotally connected to one end of a lifting link 164 which is connected at its other end to an arm 27 of the tractor rockshaft 26. A stop bracket 178 is mounted on the longitudinally extending beam 101 and has adjustably mounted therein a stop bolt 179 that is adapted to engage the front foot 163 when it is rotated clockwise as seen in FIGURE 4. The stop provides a means of raising and lowering the frame with or without the processing unit when the snapping units are not attached.

As mentioned previously, the transverse tube 102 extends outwardly beyond the longitudinally extending beams 101. These outwardly extending portions of the transverse tube 102 function to pivotally support a bell crank lever 165 having a first or vertical bell crank arm 166 and a second bell crank arm 167. The transverse tube 102 carries collars 168 for arresting axial movement of the bell crank 165. The first or vertical bell crank arm 166 is connected to the pivot shaft arm 161 through a turnbuckle 171. The turnbuckle 171 is adjustable in length to accommodate the mounting of this picker upon different tractors. A push rod 169 is pivotally connected to the free end of the second bell crank arm 167 and includes a foot 170 for holding it in a raised position relative to the bell crank arm 167 as can be best seen in FIGURE 14.

The longitudinal extending beams and platforms 104 carry a bearing mount having a bearing 173 therein for supporting one end of shaft 120. Shaft 120 extends through apertures formed in the post 130. The forward free ends of shafts 120 carry universal joints 174 which connect the shafts 120 to extensible shafts 175 that in turn terminate in second universal joints 176 having female splined couplings 177 that are adapted to be connected to the input drive shafts 220 of the picking unit.

The front tractor mounts are carried by the transverse tube 102 and include front guides 180 having an upwardly opening V-shaped notch with the upper tabs 183 bent inwardly and its lower edge forming an outwardly extending flange 182. The lock 184 is pivotally mounted on the front guides 180 by bolts 187. The locks have arcuate edges 185 and straight edges 186 that converge towards notches 188 formed in the locks 184. A rod 190 is pinned to a stud 189 carried by each lock 184 and is assembled for reciprocal motion in holes 191 formed in the transverse tube 102. A spring 192 engaging the transverse tube 102 and a collar 193 biases the rods 190 away from the transverse tube 102. A stop 194 is secured to the flange 182 and functions to limit rotation of the locks in both directions.

The operating mechanism of the picking unit 200 is of conventional design differing only in the parking stands 204 and the means by which it is mounted on the main frame 100. The picking unit is of the type including a center divider 201, a pair of outer gathering points 202, and a pair of first elevators 203. The picking and elevating mechanisms can be of any conventional design for example the design as shown in the Andrews et al. Patent No. 2,347,871 of May 2, 1944. As can be best seen in FIGURE 5, there are a pair of identical parking stands 204 mounted on the lower portion of the first elevators 203. These parking stands each include a pair of angle irons 205 having a plurality of apertures 206 and a notch 207 formed therein. This pair of angle irons 205 are arranged parallel and secured by one flange to the under surface of the first elevator 203. A pair of channels 208 are pivotally secured to the free flange of the angle irons 205 at one end and are connected by a ground-engaging bar 209 at their other end. A plurality of apertures 212 are formed in the web portion of the channels 208. A strut 210 having apertures formed in each end thereof is connected to the pair of angle irons 205 at one end and to the pair of channels 208 at the other end by pins 211 that extend through the apertures 206 and 212. By connecting the strut to the angle irons and channels at different points the parked attitude of the snapping unit can be adjusted. When the picking unit has been mounted upon the main frame, the upper pin 211 is removed, the strut folded down and the channels 208 along with the strut 210 pivoted up to a position overlapping the angle irons 205 at which position the apertures 206 and 212 are aligned and the pin 211 is then re-inserted to secure the parking stand in this position. It should also be noted that during maintenance of the tractor or the corn harvester, the parking stand can be lowered as the safety precaution.

Downwardly extending posts 230 are carried by the first elevators 203 and function to carry the snapping units pivots 232. It should be noted that the edges of the downwardly extending posts are beveled as indicated at 231 which functions to guide the snapping unit into place on the main frame. The pivots 232 are formed of rods, extending through the post 230, that have outwardly extending portions on each side and means such as a collar for preventing axial movements of the pivots.

Each side of the picking unit is provided with a socket 221 that is adapted to receive the free end of the push rods 169 carried by the main frame 100. Power is provided to operate the snapping and elevating mechanisms of the picking unit through the input drive shafts 220. These shafts are splined and are adapted to couple to the female splined couplings 177.

As shall be discussed in the Operation section it is essential to the proper operation of the harvester that the weight of the picking unit 200 exceed the total weight of the main frame 100 and processing unit 300.

A corn processing unit 300 is adapted to be connected to the rear portion of the main frame 100. This processing unit 300 may be a hopper and elevator unit, a husking unit, a shelling unit, a grinding unit or a unit combining any of these functions. Insofar as this patent is concerned the particular functional aspect of the processing unit is not involved. The means for conveniently coupling and uncoupling a processing unit of this size to a tractor mounted corn harvester and the means for supporting a processing unit such as this on the ground are, however, considered to be inventive aspects of this corn harvesting machine. The processing unit is of generally oblong shape and extends transversely to the longitudinal axis of the tractor behind the tractor's drive wheels. Although different types of processing units may be of varying sizes, they are all encased by a front wall 301, a rear wall 302 and side walls 303.

The processing unit is supported by an elongated frame 305 in the form of a laterally extending tube. A sheet metal bracket 306 is secured to each end of the elongated frame 305 and functions as the mounting means for connecting the processing unit to the elongated frame. In FIGURES 1, 4, 6, 7 and 15, the sheet metal bracket 306 has an integral forwardly extending portion 307 upon which the combination parking stand and latch member 308 is mounted. A notch 309 adapted to receive the shaft or pin 128 of the main frame is formed in the forwardly extending portion 307. The processing unit shown in FIGURES 1, 4, 6 and 7 is a husking unit which is narrower than the shelling unit shown in FIGURE 8. Since it is desirable to support the processing unit at its ends upon the frame 305, and the distance between the brackets for connecting the processing unit to the main frame is fixed, the sheet metal bracket 306 can not always be integral with the forwardly extending portion 307. Thus in FIGURE 8, separate brackets 310 having notches 311 are mounted on the frame 305 for supporting the combination parking stand and latch member 308.

A pair of mounting brackets 320 are secured to the central portion of frame 305 and served to pivotally mount a trailing elevator 321 which is further supported by struts 322. The trailing elevator 321 functions to elevate and deposit the processed material into a trailing wagon or the like.

As can be best seen in FIGURE 15, a pair of vertical braces 312 are connected to the frame 305. Braces 312 have a flange 313 that is flush against the front wall 301 of the processing unit. The flange 313 is connected to the front wall 301 of the processing unit by bolts, rivets or the like. Braces 312 have a second flange 314 lying in a plane normal to the front wall 301 of the processing unit. The front edge of flange 314 has an indentation formed therein such that an overhanging shoulder 315 is formed. An upwardly and rearwardly inclined edge 317 defines the lower half of the indentation. A semicircular notch 316 is formed in the overhanging shoulder. As shall be more fully discussed later, the inclined edge 317 functions to guide a horizontal pipe 108 towards its seat in the downwardly extending hook 304. The downwardly extending hook 304 is formed from a piece of sheet metal that has been bent to fit the overhanging shoulder and the semi-circular notch. The hook is secured to both braces 312 and thus adds rigidity to the construction.

Gear box mounting brackets 318 are secured to frame 305. As can be best seen in FIGURE 8, a gear box 350 having an input drive member 352 is mounted on the bracket 318. The input drive member has a cloverleaf shape and is adapted to be coupled to the clover leaf depression 123 of the driving member 122. The gear box 350 has an output shaft 353 that functions to transmit rotary motion to the trailing elevator 321 and the driven elements of the processing unit.

A combination drawbar and parking stand 330 is carried by the processing unit and comprises a yoke member 331 secured at its free ends by pivot means 302 to the sheet metal brackets 306. A hitch 333 is secured to the bight portion of the yoke member 331 and is adapted to be connected to the drawbar or tongue of a trailing wagon. A pair of vertical channels 334 are secured to the rear wall 302 of the processing unit. The pair of vertical channels 334 have three sets of aligned apertures 335, 336 and 337. The yoke member 331 has a pair of upwardly protruding ears 338 which are connected by a pair of struts 339 to the vertical channels 334. The upper ends of the struts 339 are selectively connected to the vertical channels 334 through either apertures 335, 336 or 337. The selection of the proper set of apertures depends upon which function the combination drawbar and parking stand 330 is to perform. The set of apertures 337 positions the combination drawbar and parking stand 330 such that it functions as a drawbar. The set of apertures 336 positions the combination drawbar and parking stand 330 such that it functions as a parking stand for the processing unit when it is secured to the main frame 100. The set of apertures 335 positions the combination drawbar and parking stand 330 such that it functions as a parking stand for the processing unit when it is standing alone.

The combination parking stand and latch member 308 are pivotally mounted on the forwardly extending portion 307 of brackets 306 at a point behind notch 309. The upper or first free end of latch member 308 has a groove 323 formed therein. The groove 323 is located such that when latch member 308 is pivoted to a horizontal position it forms with groove 309 a closed aperture in which stub shafts 128 are locked to secure the processing unit 300 in place on the main frame 100. An aperture 324 is formed in the lower or second free end of latch member 308 that is aligned with an aperture 325 formed in bracket 306 when latch member 308 is in the horizontal position. A pin 326 is slid through aligned apertures 324, 325 to lock latch members 308 in the horizontal position. A ground engaging plate 327 is secured to the lower or second free end of latch member 308 and serves to support the processing unit on the ground when the latch member is in the vertical position. An aperture 328 is formed in the upper or first free end of latch member 308 that is aligned with an aperture 329 formed in bracket 306 when the latch member 308 is in the vertical position. It should be noted that pin 326 is used to secure latch member 308 in either the horizontal or the vertical position.

*Operation*

In preparing to mount the corn harvesting device, the tractor is fitted with the front tractor mount 30, the rear tractor mounts 33, the radiator air scoop 29 and the first universal drive joint 40. The front tractor mount 30 is secured by bolts to the longitudinal chassis 21, as can be best seen in FIGURE 2. The rear tractor mounts 33 are provided in a variety of sizes and shapes to adapt the corn harvester to a large class of tractors. The rear tractor mounts are designed to fit over the rear axle of a particular tractor and to position shafts 37 relative to the ground and to the horizontal extending bar 32 of the front tractor mount 30. The first universal drive joint 40 is splined to the conventional power takeoff shaft 28 of the tractor and is held longitudinally by a spring clip or the like.

The main frame 100 having a processing unit 300 mounted thereon (as seen in FIGURE 4) is then connected and coupled to the tractor. The yoke member 331, which functions as a processing unit parking stand, is connected to the processing unit through apertures 336 when the main frame 100 and the processing unit 300 are as shown in FIGURE 4. The tractor is backed over the main frame and positioned such that the tractor mounts 133 carried by the main frame are substantially aligned with the shafts 37 carried by the tractor and the upper ends of lifting links 164 can be pinned to the free ends of lever arms 27. The relative position of the tractor's main frame and processing unit at this point is depicted as "first position" in FIGURE 9. The center of gravity of the combined main frame and processing unit is behind the lifting links 164 and thus as the rockshaft 26 is actuated the main frame is pivoted about the yoke member 331 which is functioning as a parking stand. Thus, the front portion of the main frame is elevated first. As the front portion of the main frame is elevated, the front guides 180 including upwardly opening V-shaped notches and tabs 183 direct the horizontal extending bar 32 towards the vertex of the V-shaped notches. The edge 185 of lugs 184 are cammed by the bar 32 to permit the bar 32 to seat in the V-shaped notches. When the lugs 184 have been pivoted past the center point of rod 190, the springs 192 then function to bias the lugs 184 in a locking relationship with respect to the bar 32. The position of the front portion of the main frame at this point is shown in broken lines in FIGURE 9 and is identified as "second position."

After the bar 32 has been locked in place, further rotation of rockshaft 26 causes the rear portion of the main frame to be elevated. This elevation continues until the shafts 37 of the rear tractor mounts 33 are seated in the tractor mounts 33 of the main frame. At this time, latch bars 137 are manually actuated by the operator from his tractor seat to thus secure the main frame to the tractor. The main frame 100 along with the processing unit 300 is shown in this position in FIGURE 10. Since the main frame is no longer supported by the lifting links 164, the rockshaft 26 is now rotated clockwise to position the push rods 169 for mounting the picking unit 200.

During the mounting operation of the main frame 100 the outer yoke 116 of the second universal drive joint 113 is held by the spring 45, 46 such that it is tilted back as shown in FIGURE 4. As the rear portion of the main frame is elevated, the driving member 44 on the first universal drive 40 makes contact with the outer yoke 116. As the main frame approaches the horizontal position, the rear face of the outer yoke approaches the vertical position and is released from the grasp of spring 45, 46. If during this coupling action the outer yoke 116 of the driving member 44 is not exactly aligned, the outer yoke 116 slides slightly to the rear compressing spring 118 and correct alignment is attained when the power take-off shaft 28 is engaged.

Figure 5:
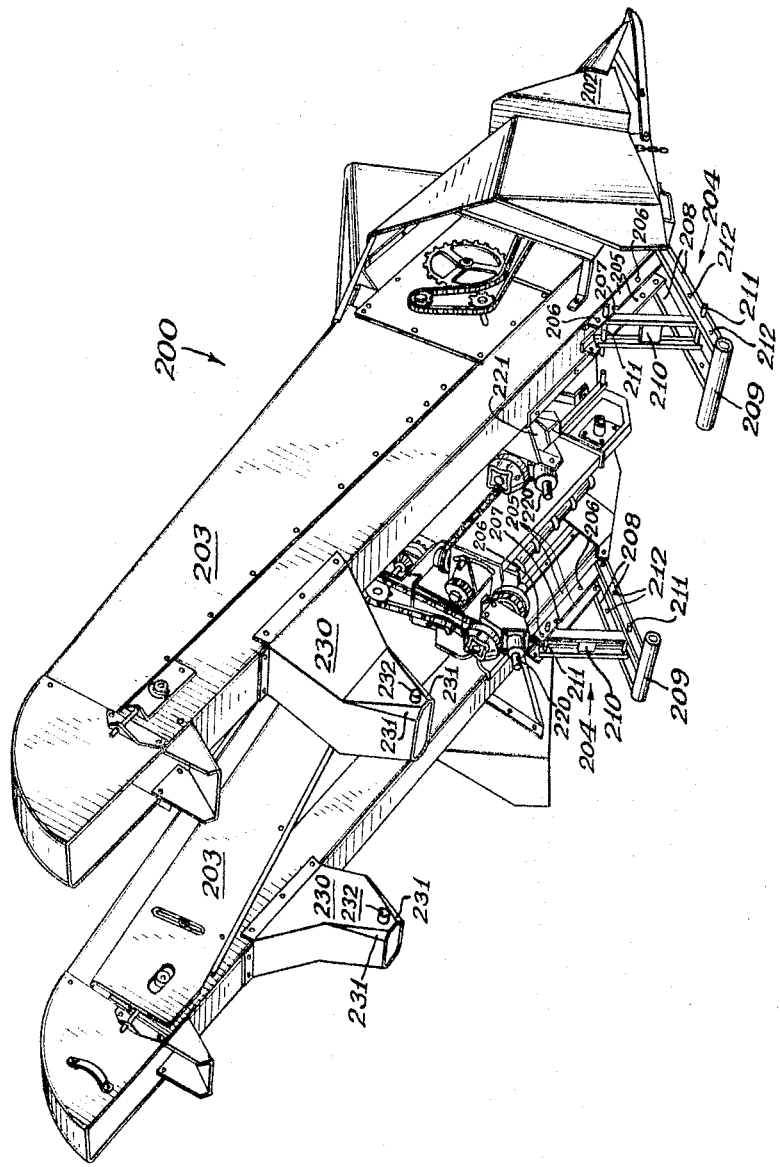
FIGURE 5 is a perspective view of the unmounted picker unit.

Prior to mounting the picking unit 200, it is supported on the ground by its parking stands 204 as shown in FIGURE 5. The tractor having the main frame 100 and processing unit 300 already mounted thereon, is driven forwardly into the picking unit 200. The diverging edges 143 of the picker mounts 142, the pivots 232 and the bevelled edges 231 of the downwardly extending post 230 all cooperate to seat the pivots 232 and the picker mounts 142. When the pivots 232 are properly seated, the latch means 144 are operated to lock the pivots 232 in the picker mounts 142. Rockshaft 26 is then rotated counterclockwise as seen in FIGURES 9 and 10, which causes the free end of push rod 169 to engage sockets 221 of the picking unit, and causes the picking unit to be pivoted about the picker mounts 142. The desired position of the picking unit 200 is attained by manipulation of rockshaft 26. The picking unit 200 is shown in the transport position in FIGURE 10. The splined couplings 177 are then manually connected to input drive shafts 220 of the picking unit.

The operator then manually repositions the parking stands 204 of the picking unit by removing pins 211 and collapsing the channels 208 and struts 210. The parking stands of the processing unit are also repositioned by changing the connection of the struts 339 from apertures 336 to apertures 337. The corn harvester is now ready for operation.

Figure 6:
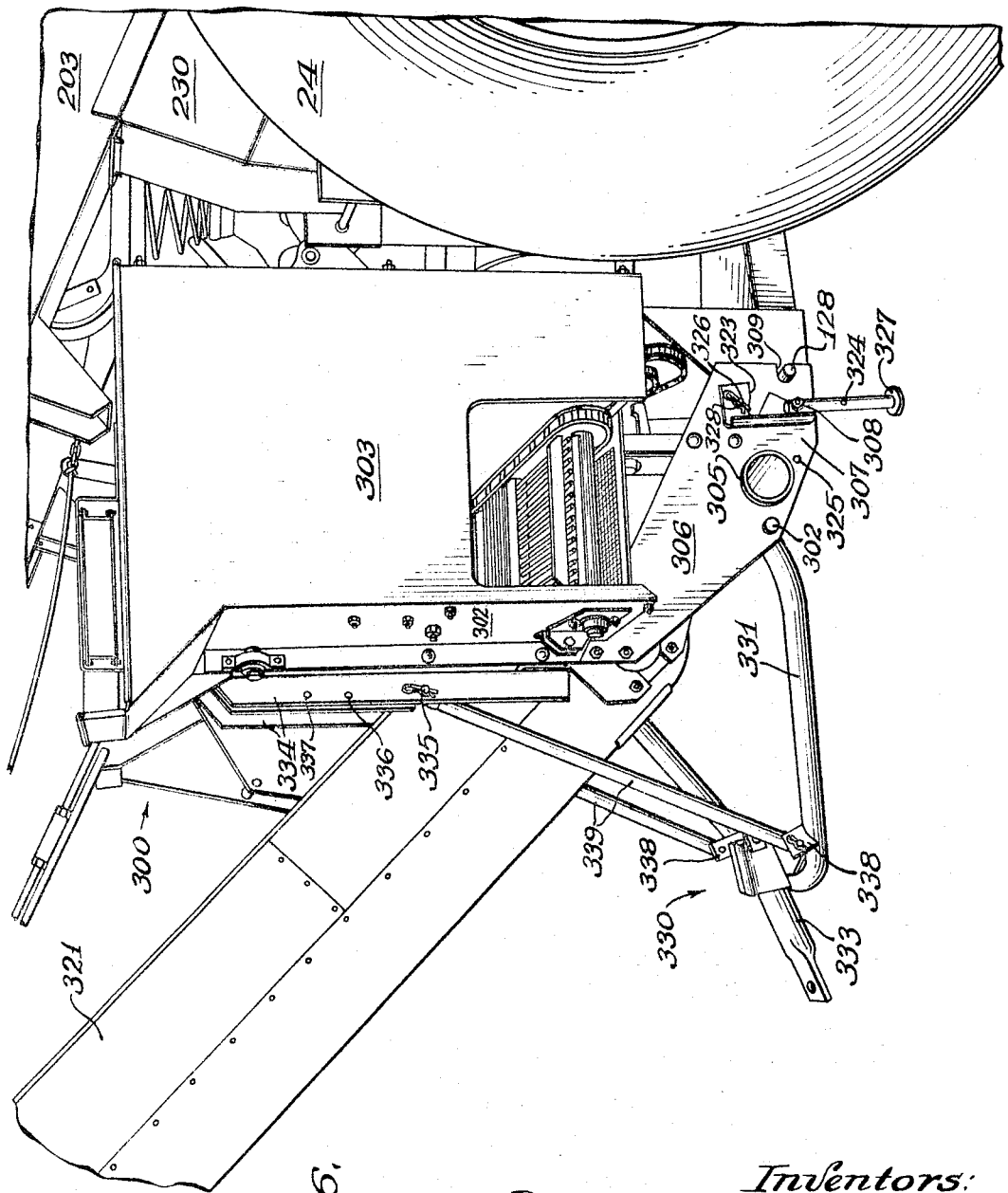
FIGURE 6 is a perspective view of the mounted processing unit with the parking stands adjusted for dismounting.
Figure 7:
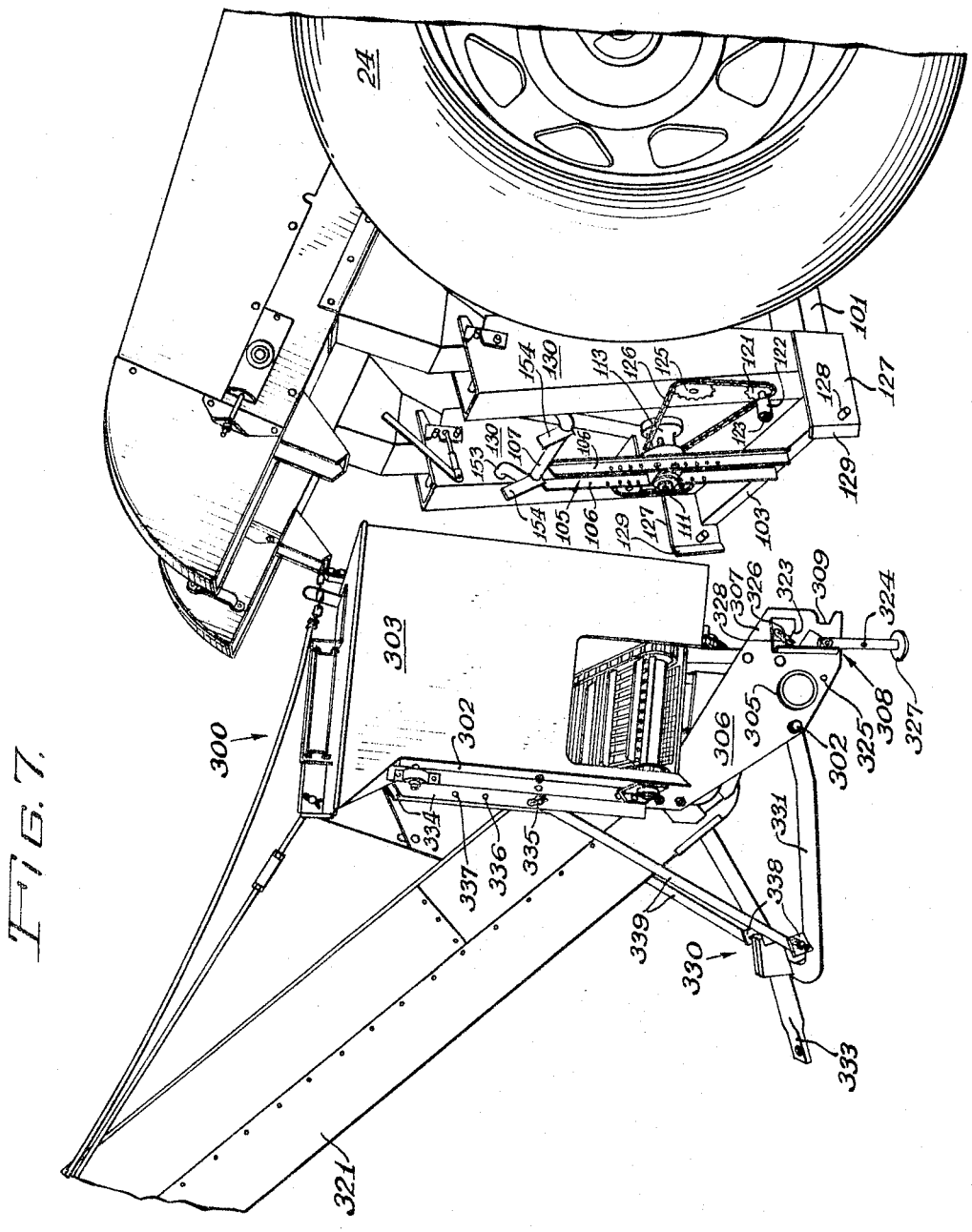
FIGURE 7 is a perspective view of the dismounted processing unit and the rear portions of the main frame and the tractor.

If it is desired to change processing units 300 with the picking unit 200 mounted, for example, to remove a husking unit and couple to a shelling unit, the following is the procedure: The pins 326 holding the latch members 308 in a horizontal position are removed. The latch members 308 are pivoted to the vertical position and the pins 326 reinserted to lock them here. The processing units parking stand 330 is repositioned by connecting the struts 339 in apertures 335. The processing unit with the parking stand so positioned is shown in FIGURE 6. With reference to FIGURE 10, an explanation of the forces involved at this point follows: The weight of the picking unit 200 carried by the push rods 169 produces a tension force in the lifting links 164 which can be transferred to pivot shaft 160, as a moment (torque in this case), and a force couple. The force couple causes a counterclockwise moment about the horizontal extending bar 32. The weight of the processing unit 300 and the main frame 100 causes a clockwise moment about horizontal extending bar 32. However, the resultant of these moments about bar 32 is counterclockwise. The counterclockwise moment tending to pivot the rear portion of main frame 100 upwardly is resisted by the engagement of seats 133 with shafts 37. It is essential in attaining this result that the picking unit 200 be of greater weight than the combined weight of the main frame 100 and the processing unit 300. Since at this point there is a counterclockwise moment about bar 32, there is no tension in the latch bars 137 and thus, they may be pivoted to the position shown in FIGURE 9 without affecting the relative position of the main frame 100 with the tractor. Releasing the latch bars 137 and positioning them, as shown in FIGURE 9, aligns stops 140, such that they are in position to engage front feet 163. The rockshaft 26 is then rotated clockwise as seen in FIGURE 10 permitting the front of the picking unit 200 to be lowered and causing front feet 163 to raise until stops 140 are engaged. The position at which these two elements engage is preset and is selected at a point that will permit further clockwise rotation of rockshaft 26. Presetting of this position can be effected either by adjusting the angle of feet 163 with respect to the pivot shaft 160 or the position of stops 140 with respect to their pivot point on the post 130. After the front feet 163 have engaged stops 140, further clockwise rotation of rockshaft 26 results in a clockwise rotation of the main frame 100 about bar 32. When the parking stand 330 engages the ground the tractor is driven forward pivoting the hook 304 about the horizontal pipe 107 and moving the support shafts 128 out of notches 309. Upon further actuation of rockshaft 26 parking stands 308 engage the ground and horizontal pipe 107 is released from the grasp of hook 304. The tractor can then be driven forward leaving the processing unit 300 supported on its stands 330 and 308. The tractor can then be backed into another processing unit and the above procedure is reversed to couple this unit.

The procedure for replacing a processing unit with the picker unit 200 not mounted is the same as with the picker unit mounted. The forces involved in this procedure are, however, different but much simpler. Referring again to FIGURES 9 and 10, the main frame 100 and mounted processing unit 300 are pivotally connected to the front of the tractor about bar 32 and are hanging on lifting links 134 at the rear of the tractor. The front feet 163 are in engagement with stop brackets 178, such that upon clockwise rotation of rockshaft 26, the main frame and processing unit is lowered, and upon counterclockwise rotation they are raised.

The parking stand can be positioned such that it functions as a drawbar for connection to a trailing wagon by connecting the struts 339 to apertures 337. The trailing wagon is connected to the hitch 333 of the drawbar 330. Thus, it is seen that a tractor mounted corn harvester adapted to be mounted on a large variety of tractors has been provided. The corn harvester is versatile in that by utilizing different processing units the corn can be harvested with husk, without husk, shelled or ground. The time involved in setting up the tractor to receive the corn harvester is minimized as is the time and work involved in connecting and coupling the various units of the corn harvester to the tractor. Connection and coupling of the various units is accomplished by a single operator from the tractor seat without the need of tools of any type.

Obviously, many modifications and variations of the present invention are possible in the light of the above teachings. It is therefore to be understood that within the scope of the appended claims the invention may be practiced otherwise than as specifically described.

We claim:

1. A tractor mounted corn picker and processing unit comprising: a tractor of the type having a longitudinally extending chassis, a rear wheel axle unit, a dirigible front wheel support, a hitch rockshaft having a lever arm secured thereto, a front support carried by said chassis beween the rear wheel axle unit and the front wheel support, and a rear support carried by said rear wheel axle unit, said front and rear supports accessible and unobstructed from below the tractor; a longitudinally extending implement main frame having front and rear portions, front guides mounted on the top of said front portion adapted to engage the front support when the longitudinally extending implement main frame is elevated, coupling means for automatically pivotally connecting said front guide to said front support, lifting links secured at one end to said rear portion and adapted to be connected at the other end to the lever arm of said hitch rockshaft, interengaging latch means on said rear support and said rear portion for locking the rear portion of said longitudinally extending implement main frame in an elevated position; means on said longitudinally extending implement main frame for supporting a corn picking unit; a corn processing unit adapted to be secured to the rear portion of said longitudinally extending implement main frame; coupling means on the rear portion of said longitudinally extending main frame and on said corn processing unit for releasably connecting these units, such that the center of gravity of the longitudinally extending main frame including the corn processing unit is rearwardly of the point where the lifting links are connected to the main frame so that when the hitch rockshaft is actuated the front portion of the main frame is elevated and pivotally connected to said front support and upon further actuation of the hitch rockshaft the rear portion of the main frame is elevated to a position where said interengaging latch means can be engaged to connect the main frame to the tractor in an elevated position.

2. The invention as set forth in claim 1 wherein said means on said main frame for supporting a corn picking unit includes: a rear mount for pivotally connecting the rear of the corn picking unit to the rear portion of said implement main frame; a pivot shaft mounted on the rear portion of said main frame, a lifting arm secured to said pivot shaft and extending rearwardly therefrom, the free end of said lifting arm being connected to said one end of the lifting link, a generally vertical pivot shaft arm secured to said pivot shaft, a bellcrank pivotally mounted on the front portion of the main frame, said bellcrank having a generally vertical bellcrank arm and a rearwardly extending bellcrank arm, a link pivotally connected to the free end of said vertical pivot shaft arm and at its other arm to the free end of said vertical bellcrank arm, a push rod pivotally secured at one end to the free end of said rearwardly extending bellcrank arm, said rod having a pivot located at its free end that is adapted to be received in a socket on a corn picking unit such that upon actuation of said hitch rockshaft the bellcrank lever will be rotated to actuate the push rod and pivot the corn picking unit about its rear mount.

3. The invention as set forth in claim 2 wherein said pivot shaft has a foot extending forwardly therefrom and said main frame has a stop secured thereto adapted to engage said foot as it moves downwardly and arrest the rotation of said pivot shaft.

4. The invention as set forth in claim 3 wherein said stop comprises a stop bracket secured to the main frame and having a threaded portion, and a stop bolt screwed into said threaded portion to provide an adjustable stop.

5. The invention as set forth in claim 3 wherein posts extend upwardly from the rear portion of the main frame; and said interengaging latch means include, a horizontal bar carried by said rear support, an upwardly opening seat carried by said post adapted to receive the horizontal bar, and a locking means carried by said post comprising, a lever pivotally mounted intermediate its ends on said post, the upper end of said lever having a forwardly opening notch adapted to receive said horizontal bar and secure it in said upwardly opening seat when said lever is pivoted to its forward position, the lower end of said lever forming a stop that is positioned, when the lever is pivoted to its rear position, in the path of said foot and functions to arrest the upward movement of said foot when the lever is so positioned to thus permit the rear portion of said main frame to be lowered with respect to the tractor.

6. The invention as set forth in claim 1 wherein said front support includes a pipe hung beneath the chassis along a transverse axis; and said front guide includes upwardly opening notches adapted to receive said pipe and said coupling means include spring biased overcentered type latches that are adapted to be opened by the pipe as it is guided into place by said upwardly opening notches and automatically locks when the pipe is seated.

7. The invention as set forth in claim 1, wherein said means on said longitudinally extending implement main frame for supporting a corn picking unit includes; a post extending upwardly from the main frame, a forwardly converging notch formed in the upper front surface of said post adapted to receive a horizontal bar carried by the corn picking unit; latching means for restraining the horizontal bar carried by the corn picking unit in said forwardly converging notch.

8. The invention as set forth in claim 7 wherein said latch means comprise a bar journalled in said post below said forwardly converging notch and having end portions extending outwardly of said post, latch plates secured to each of said end portions, notches formed in the longitudinal edge of said latch plates corresponding in size to the horizontal bar carried by the corn picking unit, a bellcrank lever pivotally mounted at the free end of its first arm to said post, a link pivotally connected at one end to one of said latch plates and at the other end to the vertex of said bellcrank lever, the second arm of said bellcrank lever serving as a handle to engage and disengage said latch means.

9. The invention as set forth in claim 1 wherein said longitudinally extending implement main frame has a vertical section extending upwardly from its rear portion, said vertical section having a generally horizontal upper edge; said processing unit having a hook extending forwardly and downwardly from its upper edge, said hook adapted to receive said generally horizontal upper edge, engaging means on the rear portion of said main frame and said processing unit, below said generally horizontal upper edge and said hook respectively, adapted to engage and arrest relative movement therebetween when said main frame reaches the horizontal position.

10. The invention as set forth in claim 9 wherein latching means are provided to secure said processing unit to said main frame when said engaging means are engaged.

11. A corn processing unit of the type adapted to be supported by a tractor, transversely of the tractor axis behind the tractor's rear drive wheels, comprising; a front surface having an upper and a lower edge; a rear surface having an upper and a lower edge; connecting means on said front surface for supporting the corn processing unit on a tractor, said connecting means including a pair of laterally spaced plates lying in planes generally horizontal to the longitudinal axis of the tractor, a first forwardly opening notch formed in each of said plates; a pair of combination parking stands and latches each comprising, an elongated member pivotally mounted at its mid-point on one of said laterally spaced plates at a point rearwardly of said first forwardly opening notch, means for releasably securing one end of said elongated member to the adjacent laterally spaced plate at a point above its pivot point, such that the other end of said elongated member is adapted to engage the ground and support the corn processing unit, a forwardly opening notch formed in said one end of the elongated member such that when said elongated member is pivoted to a horizontal position said first and second forwardly opening notches cooperate to form a closed aperture, and means for releasably securing said other end of said elongated member to the adjacent laterally spaced plate with said elongated member in the horizontal position; a combination parking leg and drawbar comprising a rearwardly extending yoke-shaped member having its free ends pivotally connected to said laterally spaced plates, hitching means on the bight portion of said yoke-shaped member, and strut means pivotally connected at one end to said yoke-shaped member and adapted to be pivotally connected to said rear surface of the corn processing unit in a plurality of elevations.

12. The invention as set forth in claim 11 wherein said means on said front surface for supporting the corn processing unit on a tractor further includes a hook extending forwardly and downwardly from the upper edge of said front surface.

13. A tractor mounted harvesting device comprising; a tractor of the type having a longitudinally extending chassis, a rear wheel axle unit, a dirigible front wheel support, a hitch rockshaft having a lever arm secured thereto, a power take-off shaft extending rearwardly from said rear wheel axle unit, a front support carried by said chassis between the rear wheel axle unit and the front wheel support, and a rear support carried by said rear wheel axle unit, said front and rear supports accessible and unobstructed from below the tractor, a first universal drive joint comprising an inner yoke mounted on said power take-off shaft, an outer yoke connected to the inner yoke by a spider, and a driving member connected to said outer yoke; a longitudinally extending implement main frame having front and rear portions, guides mounted on said front portion adapted to engage the front support when the longitudinally extending implement main frame is elevated, coupling means for pivotally connecting said guides to said front support, lifting links secured at one end to said rear portion and at the other end to the lever arm of said hitch rockshaft, latch means on said rear support and said rear portion for locking the rear portion of said longitudinally extending implement main frame in an elevated position; said longitudinally extending implement main frame having a vertical section extending upwardly from its rear position, a driven shaft rotatably mounted on said vertical section, a second universal drive joint splined to said driven shaft and extending forwardly therefrom, a driven member connected to said second universal drive joint, and a leaf spring including a catch secured to said vertical section above said driven shaft for supporting said driven member in a predetermined position relative to said vertical section such that it will engage the driving member of the first universal drive joint when said main frame is elevated.

14. The invention as set forth in claim 13 wherein said second universal drive joint comprises a rear yoke having a splined portion slidingly engaging said driven shaft, means for limiting the movement between said rear yoke and said driven shaft, spring means for yieldably biasing said rear yoke in the forward direction, a forward yoke connected to the rear yoke through a spider and said driven member being connected to said rear yoke.

15. The invention as set forth in claim 13 wherein a corn processing unit and means for attaching and coupling it to said main frame are provided; said means for attaching said corn processing unit to said main frame comprising a horizontal bar connected to said main frame and defining the upper edge of said vertical section, horizontal stub shafts extending outwardly from each side of the main frame, said stub shafts being located on the rear portion of said main frame below said horizontal bar, a downwardly and forwardly extending hook mounted on said corn processing unit, longitudinally extending plates having forwardly opening notches formed in their rear edges secured to the bottom lower edge of each side of said corn processing unit, said hook adapted to grasp said horizontal bar as the main frame is elevated, and said stub shafts adapted to nest in said forwardly opening notches upon further elevation of said main frame, and latch means for securing the stub shafts in nested position in the forwardly opening notches.

16. The invention as set forth in claim 15 wherein said latches for holding the stub shafts in nested position comprise; members pivotally mounted on said longitudinally extending plates at a point behind said forwardly opening notches, a groove formed in a first free end of said members positioned such that when said members are pivoted to a substantially horizontal position the groove locks said stub shafts in their nested position, and means for securing said members in the horizontal position.

17. The invention as set forth in claim 16 wherein said means for coupling said corn processing unit to said main frame includes a drive member mounted on the rear portion of said main frame below said horizontal bar and having a rearwardly extending coupling member, means for drivingly connecting said driven shaft on said vertical section to said drive member, a driven member mounted on the corn processing unit and having a forwardly extending coupling member, means for drivingly connecting said driven member mounted on the corn processing unit to the processing unit's components requiring power, said forwardly extending coupling member adapted to join said rearwardly extending coupling member upon elevation of said main frame.

18. The invention as set forth in claim 17 wherein said processing unit includes parking stands and a drawbar for connection to a trailing wagon, wherein said parking units include ground-engaging means secured to the second free end of each of said members pivotally mounted on said longitudinally extending plates, means for securing said members in a vertical position, a yoke-shaped member having its free ends pivotally mounted on said longitudinally extending plates, strut means pivotally connected at one end to bight portion of said yoke-shaped member, means on said corn processing unit for securing the other end of said strut means at a plurality of elevations such that the yoke-shaped member can function either as a third parking stand or as a drawbar.

19. The invention as set forth in claim 15 wherein said means for coupling said corn processing unit to said main frame includes a drive member mounted on the rear portion of said main frame below said horizontal bar and having a rearwardly extending coupling member, means for drivingly connecting said driven shaft on said vertical section to said drive member, a driven member mounted on the corn processing unit and having a forwardly extending coupling member, means for drivingly connecting said driven member mounted on the corn processing unit to the processing unit's components requiring power, said forwardly extending coupling member adapted to join said rearwardly extending coupling member upon elevation of said main frame.

20. The invention as set forth in claim 19 wherein said processing unit includes parking stands and a drawbar for connection to a trailing wagon, wherein said parking units include ground-engaging means secured to the second free end of each of said members pivotally mounted on said longitudinally extending plates, means for securing said members in a vertical position, a yoke-shaped member having its free ends pivotally mounted on said longitudinally extending plates, strut means pivotally connected at one end to the bight portion of said yoke-shaped member, means on said corn processing unit for securing the other end of said strut means at a plurality of elevations such that the yoke-shaped member can function either as a third parking stand or as a drawbar.

21. A tractor-mounted harvesting device; a tractor of the type having a longitudinally extending chassis, a rear wheel axle unit, a dirigible front wheel support, a hitch rockshaft having a lever arm secured thereto, a power take-off shaft extending rearwardly from said rear wheel axle unit, a front support carried by said chassis between the rear wheel axle unit and the front wheel support, and rear support carried by said rear wheel axle unit, said front and rear supports accessible and unobstructed from below the tractor; a longitudinally extending implement main frame having front and rear portions, guide means mounted on said front portion adapted to engage the front support when the longitudinally extending implement main frame is elevated, coupling means for pivotally connecting said guides to said front support, lifting links secured at one end to said rear portion and at the other end to the lever arms of said hitch rockshaft, latch means on said rear support and said rear portion for locking the rear portion of said longitudinally extending implement main frame in an elevated position, said longitudinally extending implement main frame having a vertical section extending upwardly from the rear portion, a driven member mounted on said vertical section, said driven member adapted to be automatically coupled to said power take-off shaft when the rear portion of said longitudinally extending implement main frame is elevated; a corn processing unit and means for attaching and coupling it to said main frame; said means for attaching said corn processing unit to said main frame comprising a horizontal bar connected to said main frame, unobstructed from above and defining the upper edge of said vertical section, horizontal stub shafts extending outwardly from each side of the main frame, said stub shafts being located on the rear portion of said main frame below said horizontal bar, a downwardly and forwardly extending hook mounted on said corn processing unit, longitudinally extending plates having forwardly opening notches formed in the rear edges secured to the bottom lower edge of each side of said corn processing unit, said hook adapted to grasp said horizontal bar as the main frame is elevated, and said stub shafts adapted to nest in said forwardly opening notches upon further elevation of said main frame, and latch means for securing the stub shafts in nested positions in the forwardly opening notches.

22. The invention as set forth in claim 21 wherein said latches for holding the stub shafts in nested position comprise; members pivotally mounted on asid longitudinally extending plates at a point behind said forwardly opening notches, a groove formed in a first free end of said members positioned such that when said members are pivoted to a substantially horizontal position the groove locks said stub shafts in their nested position, and means for securing said members in the horizontal position.

23. A tractor mounted harvesting device including a picking unit comprising; a tractor of the type having a longitudinally extending chassis, a rear wheel axle unit, a dirigible front wheel support, a hitch rockshaft having a lever arm secured thereto, a front support carried by said chassis between the rear wheel axle unit and the front wheel support, and a rear support carried by said rear wheel axle unit; a longitudinally extending implement main frame having front and rear portions, means mounted on said front portion adapted to pivotally connect said main frame to said front support, a pivot shaft journalled on said rear portion having a rearwardly extending lifting arm rigid therewith, a lifting link secured at one end to the free end of said lifting arm and at the other end to said rockshaft lever arm, an upwardly extending pivot shaft arm secured to said pivot shaft, a bell crank lever pivotally supported on said front portion including first and second arms, a link connecting the free end of said pivot shaft arm and said first arm, means carried by said second arm for supporting the weight of said picking unit, said arms arranged such that the weight of said picking unit produces a force tending to pivot said main frame upwardly about said means for pivotally connecting said main frame to said front support; and the weight of said picking unit being greater than the weight of said main frame such that the upper force on the rear portion of said main frame exceeds the downward gravitational force of said main frame.

24. The invention as set forth in claim 23 wherein said lifting arm extends rearwardly from said pivot shaft, said pivot shaft arm extends generally upwardly from said pivot shaft, said first arm extends generally vertically and said second arm extends upwardly and rearwardly.

25. The invention as set forth in claim 23, wherein the harvested mounting device also includes a processing unit secured to the rear portion of said main frame and wherein the total weight of said main frame and processing unit is less than the weight of said picking unit.

26. The invention as set forth in claim 24, wherein a foot is secured to and extends forwardly from said pivot shaft, a movable stop carried by said main frame adapted to be positioned in the path of said foot to prevent further rotation of said pivot shaft.

27. The invention as set forth in claim 25, wherein a stop is provided for positioning said movable stop in the path of said foot.

28. The invention as set forth in claim 25, wherein the rear portion of said main frame includes a vertically extending section, means on said vertically extending section for connection to the rear support carried by said rear wheel axle unit, a lock pivotally supported on said vertically extending section including, an upper portion adapted to lock said means for connecting to said rear support, and a lower portion including said movable stop.

29. The invention as set forth in claim 24, wherein the harvested mounting device also includes a processing unit secured to the rear portion of said main frame and wherein the total weight of said main frame and processing unit is less than the weight of said picking unit.

References Cited by the Examiner

UNITED STATES PATENTS

| | | | |
|---|---|---|---|
| 2,376,539 | 5/1945 | Hitchcock et al. | 56—20 |
| 2,736,152 | 2/1956 | Andrews et al. | 56—15 |
| 2,831,307 | 4/1958 | Karsmo et al. | 56—2 |
| 2,834,171 | 5/1958 | Aber | 56—18 |
| 2,981,343 | 4/1961 | Berky | 172—274 |
| 3,035,384 | 5/1962 | Mitchell | 56—15 |

ABRAHAM G. STONE, *Primary Examiner.*

ANTONIO F. GUIDA, *Examiner.*